July 12, 1927.
F. G. ROSE
1,635,958
TRANSMISSION
Filed June 29, 1923
2 Sheets-Sheet 1
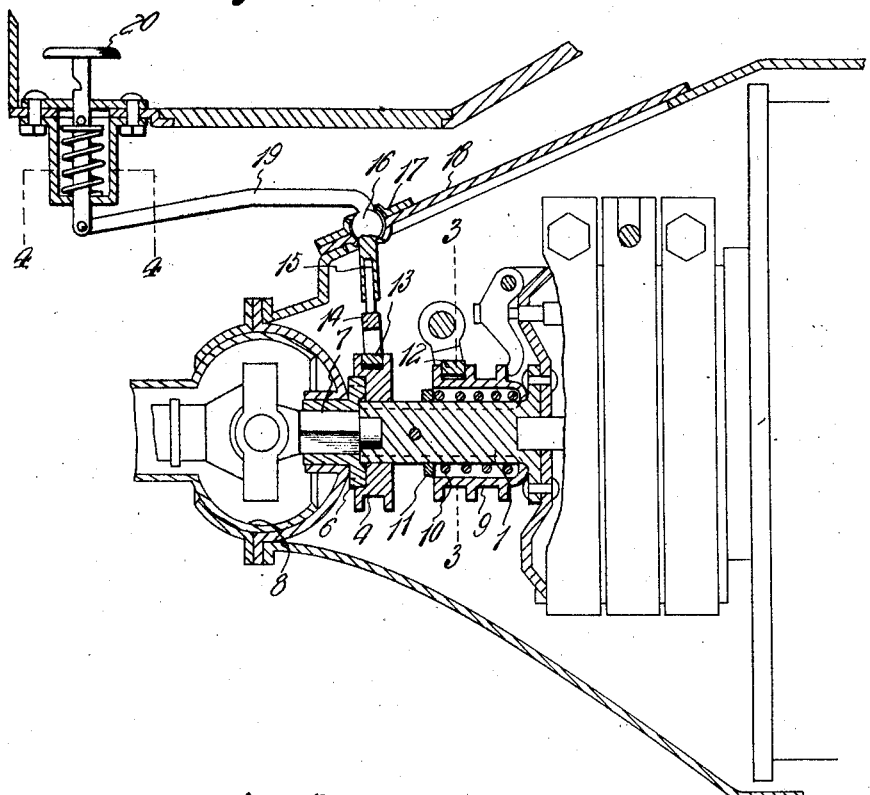
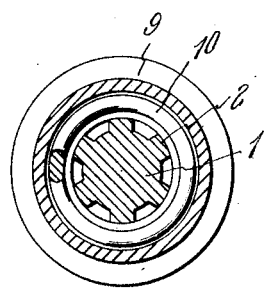
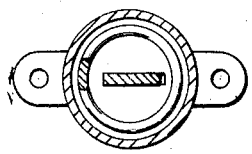
F. G. Rose
INVENTOR
BY Victor J. Evans
ATTORNEY
WITNESS:

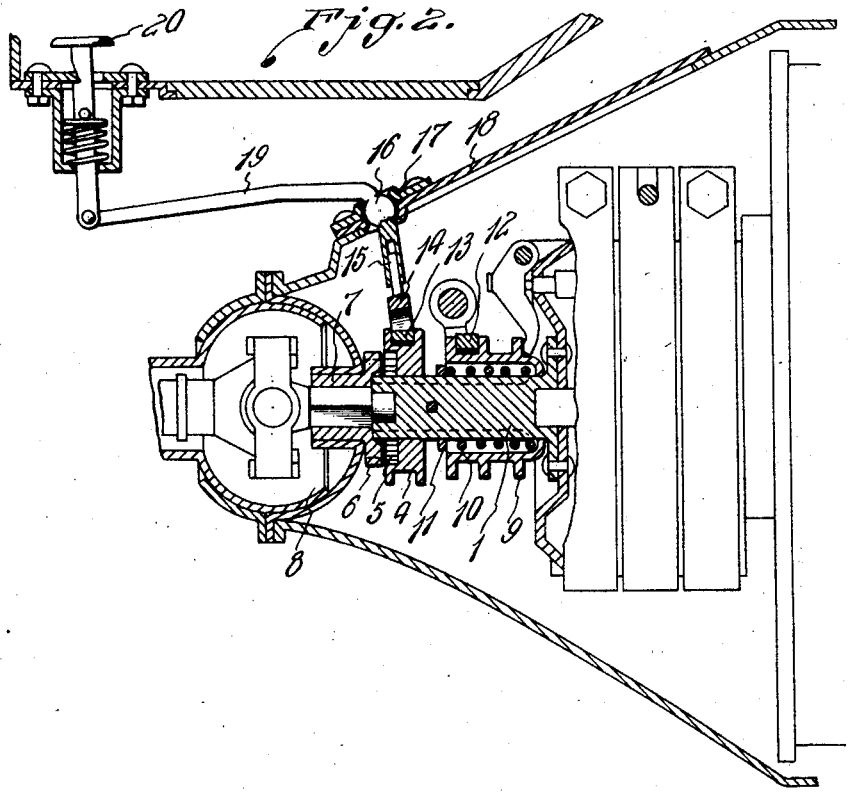

Patented July 12, 1927.

1,635,958

UNITED STATES PATENT OFFICE.

FRED G. ROSE, OF ROCKY FORD, COLORADO.

TRANSMISSION.

Application filed June 29, 1923. Serial No. 648,604.

This invention relates to improvements in the transmission means of the Ford type of motor, the general object of the invention being to provide means for permitting the entire transmission to turn with the crank shaft so that the clutch discs will not act as a drag and make difficult starting, especially in cold weather.

Another object of the invention is to provide means for actuating the attachment from a point adjacent the driver's seat.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through a portion of a motor vehicle showing my invention in use.

Figure 2 is a similar view with the parts in a different position.

Figure 3 is a section on line 3—3 of Figure 1.

Figure 4 is a section on line 4—4 of Figure 1 and Figures 5 and 6 are elevations of elements embodied in the invention.

In carrying out my invention I shorten the shaft 1 of the transmission brake drum and provide the same with longitudinally extending teeth 2, these teeth engaging the teeth 3 formed on the bore of a flanged collar 4 which is slidably mounted on the shaft. This collar is formed with a ring gear 5 with which engage teeth 6 formed on a hollow stub shaft 7 which is carried by the front universal ball cap 8 and which is formed with a square bore to receive the square part of the knuckle joint. I eliminate the transmission clutch bearing, its support and the clutch shift and use instead a spool-like member 9 which is pressed against the clutch fingers by a spring 10 placed inside the member and having one end bearing against a flange formed thereon and its other end against a ring 11 which is fastened to the shaft 1. This provides a space for the collar 4 to move in, the gear thus limiting movement of the collar in one direction and the ring 11 forming an abutment to limit movement of said collar in an opposite direction. This member 9 is engaged by the clutch release ring 12 and the collar 4 is engaged by the ring 13, carried by a forked member 14 which has its shank engaging a socket 15 in a ball 16 movably mounted in a socket 17 formed in the cover plate 18 of the transmission housing. The ball 16 is connected by a rod 19 with a spring pressed pedal 20 which is carried by one of the base boards so that it can be easily moved by the driver.

As shown the parts are normally held in a position with the ring gear 5 and the collar 4 in mesh with the teeth on the stub shaft so that the transmission will work as an ordinary transmission. When it is desired to start the motor the pedal is depressed so as to shift the collar 4 upon the shaft 1 to release the same from the stub shaft. This will permit the entire transmission assembly to move with the motor shaft and thus the clutch discs will not act as a drag to make hard starting. As soon as the foot is removed from the pedal the parts will return to normal position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a transmission structure of the character described, a drum shaft including spaced longitudinal teeth, a collar slidably mounted on the shaft, teeth formed in the bore of said collar and engaging the teeth on the shaft to prevent rotation of the collar with respect to the shaft, means for shifting the collar on the shaft, a ring gear formed on one end of the collar, a universal joint associated with said shaft and including a squared portion, a hollow stub shaft having a squared portion to accommodate the corresponding portion of the universal joint, and an annular flange at one end thereof, teeth formed on the edge of the flange and adapted to be engaged by the internal teeth of said ring gear, and an abutment on said drum shaft for limiting the movement of the collar.

In testimony whereof I affix my signature.

FRED G. ROSE.